(12) United States Patent
Jeon

(10) Patent No.: US 9,576,550 B2
(45) Date of Patent: Feb. 21, 2017

(54) DATA INTERFACE METHOD AND APPARATUS USING DE-SKEW FUNCTION

(71) Applicant: Phil Jae Jeon, Hwaseong-si (KR)

(72) Inventor: Phil Jae Jeon, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/597,866

(22) Filed: Jan. 15, 2015

(65) Prior Publication Data

US 2015/0206273 A1 Jul. 23, 2015

(30) Foreign Application Priority Data

Jan. 20, 2014 (KR) .................. 10-2014-0006952

(51) Int. Cl.
*H04N 5/06* (2006.01)
*G09G 5/00* (2006.01)
*H04N 5/067* (2006.01)

(52) U.S. Cl.
CPC ............. *G09G 5/006* (2013.01); *G09G 5/008* (2013.01); *G09G 2370/14* (2013.01); *H04N 5/06* (2013.01); *H04N 5/067* (2013.01)

(58) Field of Classification Search
CPC .. G06T 1/20; G09G 2370/14; G09G 2370/00; H04N 5/067; H04N 5/06; H04N 5/44
USPC ....................................................... 348/521
See application file for complete search history.

(56) References Cited

U.S. PATENT DOCUMENTS

| 4,354,057 | A | * | 10/1982 | Atal ..................... G06T 9/004 |
| | | | | 704/209 |
| 5,987,543 | A | * | 11/1999 | Smith .................... G06F 3/14 |
| | | | | 348/469 |
| 6,232,806 | B1 | * | 5/2001 | Woeste .................. G06F 1/10 |
| | | | | 327/149 |
| 6,292,116 | B1 | * | 9/2001 | Wang ................ H03K 19/1774 |
| | | | | 341/100 |
| 6,335,647 | B1 | | 1/2002 | Nagano |
| 6,392,641 | B1 | | 5/2002 | Nishimura et al. |
| 6,570,428 | B1 | | 5/2003 | Liao et al. |
| 7,301,996 | B1 | * | 11/2007 | Chi ..................... G06F 13/423 |
| | | | | 327/161 |
| 7,400,173 | B1 | * | 7/2008 | Kwong .......... H03K 19/018521 |
| | | | | 326/115 |
| 7,720,107 | B2 | * | 5/2010 | Bhattacharya ...... G06F 13/4291 |
| | | | | 370/464 |

(Continued)

*Primary Examiner* — Michael Lee
(74) *Attorney, Agent, or Firm* — Myers Bigel, P.A.

(57) ABSTRACT

A low voltage differential signaling (LVDS) transmitter may include an LVDS transmission device configured to generate a transmission clock and serial data, which are synchronized to the transmission clock on respective clock and data channels. The transmission clock may have different signal patterns when the LVDS transmission device is operating in normal and de-skew modes of operation. A de-skew controller is also provided, which is electrically coupled to the LVDS transmission device. The de-skew controller is configured to drive the LVDS transmission device with control signals that switch the LVDS transmission device between the normal and de-skew modes of operation. A duty cycle of the transmission clock during the de-skew mode of operation may be unequal to a duty cycle of the transmission clock during the normal mode of operation.

15 Claims, 17 Drawing Sheets

(56) References Cited

U.S. PATENT DOCUMENTS

| | | | |
|---|---|---|---|
| 8,344,768 B2 | 1/2013 | Kim | |
| 2002/0031141 A1* | 3/2002 | McWilliams | H04Q 11/0478 370/463 |
| 2003/0020771 A1* | 1/2003 | Rehmann | B41J 2/04541 347/9 |
| 2003/0085736 A1* | 5/2003 | Tinsley | H03K 19/017527 326/81 |
| 2006/0119449 A1* | 6/2006 | Fusayasu | H04B 3/28 333/12 |
| 2007/0103204 A1* | 5/2007 | Egan | G09G 5/006 327/100 |
| 2010/0060557 A1 | 3/2010 | Hsu | |
| 2011/0007066 A1 | 1/2011 | Chang et al. | |
| 2011/0033188 A1* | 2/2011 | Elbers | H04J 14/02 398/79 |
| 2012/0056870 A1* | 3/2012 | Koh | G09G 3/20 345/215 |
| 2012/0106688 A1 | 5/2012 | Sarmento | |
| 2013/0076425 A1* | 3/2013 | Oh | G11C 7/1051 327/263 |
| 2013/0169870 A1* | 7/2013 | Lee | H04N 5/06 348/536 |
| 2014/0043079 A1* | 2/2014 | Ebuchi | G06F 13/4282 327/237 |

\* cited by examiner

FIG. 4

| Pin | I/O | Pin Description | Remarks |
|---|---|---|---|
| VBLK_FLAG | Input | Flag signal for V-blank (from Logic) | |
| VSYNC/HSYNC | Input | Control signal for video | |
| DATA<m:0> | Input | R/G/B Video data | |
| CKIN | Input | Pixel clock | |
| VBLK_FLAG_I | INT | Flag signal for V-blank (Internal only) | |
| CKI | INT | Pixel clock (Internal only) | |
| AUTO_SEL | INT | Auto de-skew selection pin | Low : Auto de-skew disable<br>High : Auto de-skew enable |
| CNT_100C | INT | Control pin for indicating 100cycle | |
| DESKEW_TRN | INT | De-skew training indicator signal | |
| TXP# / TXN# | Output | LVDS TX output Data (Serialization) | |
| TXCLKP/N | Output | LVDS TX output clock | |

FIG. 7

| Pin | I/O | Pin Description | Remarks |
|---|---|---|---|
| AUTO_SEL | Input | Selection pin for auto de-skew or not | Low : Auto-de-skew disable<br>High : Auto-de-skew enable |
| RCKIN | Input | Pixel clock for LVDS RX | |
| RDIN1~n | Input | Input Serial data | |
| SCLK<6:0> | INT | Sampling clock for de-serializing the input data | |
| LDOUT | INT | Lock indicator signal of DLL | |
| CK_8DIV | INT | 8 divided pixel clock for clock pattern detection | FCK_8DIV = FCKIN/8 |
| DPT<7:0> | INT | Clock pattern sampling data for 8 clock | * Refer to the clock pattern |
| DESKEW_CNT | INT | De-skew / Normal mode selection pin | Low : Normal mode<br>High : De-skew mode |
| CLKJ | INT | Clock for de-skew block | |
| DES_D<6:0> | INT | De-serialized data from input serial data for de-skewing | |
| SKC<3:0> | INT | Control signal for adjusting the Clock to data skew | |
| RDO<m:0> | Output | Serial to parallel output data | |
| RXCLKO | Output | LVDS RX Output clock | |

DATA INTERFACE METHOD AND APPARATUS USING DE-SKEW FUNCTION

REFERENCE TO PRIORITY APPLICATION

This application claims priority under 35 U.S.C. §119(a) from Korean Patent Application No. 10-2014-0006952 filed on Jan. 20, 2014, the disclosure of which is hereby incorporated herein by reference in its entirety.

BACKGROUND

Embodiments of the inventive concept relate to a data interface apparatus and method, and more particularly, to an apparatus and method for interfacing data at high speed.

According to low voltage differential signaling (LVDS) interfaces that have been used in display devices, a clock signal and data are independent from each other and data is restored using the clock signal. Although compensation of skew between clock signal and data is important, a special protocol or standard about this has not yet been proposed. Therefore, it is necessary to minimize skew between clock signal and data in a physical layer of a cable, a printed circuit board (PCB), and a chip. However, there is a limit to minimizing the skew only with such exertion in the physical layer, and therefore, a max data rate of a conventionally used LVDS interface is typically 700 Mbps or less per channel.

With the increase of resolution in digital television (DTV), it is unavoidable to increase the number of channels when the conventional LVDS interface is used, which leads to an increase in cost and a decrease in quality.

SUMMARY

A low voltage differential signaling (LVDS) transmitter according to some embodiments of the invention includes an LVDS transmission device configured to generate a transmission clock and serial data, which are synchronized to the transmission clock, on respective clock and data channels. The transmission clock has different signal patterns when the LVDS transmission device is operating in normal and de-skew modes of operation. A de-skew controller is also provided, which is electrically coupled to the LVDS transmission device. The de-skew controller is configured to drive the LVDS transmission device with control signals that switch the LVDS transmission device between the normal and de-skew modes of operation. In some of these embodiments of the invention, a duty cycle of the transmission clock during the de-skew mode of operation is unequal to a duty cycle of the transmission clock during the normal mode of operation. In addition, during the de-skew mode of operation, both the transmission clock and the serial data may have respective predetermined patterns.

According to additional embodiments of the invention, during the de-skew mode of operation, the de-skew controller provides the LVDS transmission device with a de-skew control signal that determines a de-skew mode period and a de-skew training signal that determines a de-skew data pattern transmission period. The de-skew controller may even generate the de-skew control signal in response to a vertical blank flag signal generated by the LVDS transmission device. This LVDS transmission device may include a transmission phase-locked loop (PLL) configured to generate the transmission clock, a serializer configured to convert parallel data received at an input of the LVDS transmission device into the serial data, and a transmission driver, which is configured to transmit the transmission clock and the serial data to respective clock and data channels at an output of the LVDS transmission device.

According to still further embodiments of the invention, a low voltage differential signaling (LVDS) receiver may include a pattern detector, which is configured to detect a pattern of a clock received at an input thereof and determine an operating mode of the receiver from a plurality of possible operating modes based on the detected pattern, and a deserializer. This deserializer is configured to delay data received at a serial data port of the receiver and compare the delayed data with a de-skew data pattern to thereby determine a pass/fail condition when the receiver is disposed in a de-skew mode of operation. According to some embodiments of the invention, the pattern detector may detect a pattern of the clock by evaluating a duty cycle of the clock received at the input to thereby determine whether a normal mode of operation or the de-skew mode of operation is to be entered.

In some of these embodiments of the invention, the deserializer may include a delay device configured as a plurality of delay cells electrically coupled in series. This delay device may be configured to receive the data received at the serial port and may be responsive to a delay control signal that determines a latency provided by the delay device. A serial-to-parallel converter may also be provided, which is configured to convert serial data output from the delay device into parallel data. In addition, the deserializer may include a de-skew circuit configured to compare the parallel data with the de-skew data pattern to thereby determine the pass/fail condition.

According to some additional embodiments of the inventive concept, there is provided a low voltage differential signaling (LVDS) transmitter including an LVDS transmission block configured to generate and transmit a transmission clock signal to an LVDS receiver through a clock channel and to transmit serial data synchronized with the transmission clock signal through at least one data channel and a de-skew controller configured to control an operation of the LVDS transmission block in a de-skew mode. The LVDS transmission block generates the transmission clock signal in a different pattern according to an operation mode. The operation mode may include the de-skew mode and a normal mode and a pulse width or a duty ratio of the transmission clock signal may change according to the operation mode. The de-skew mode may be performed during part of a vertical blank period while a vertical synchronous signal for frame synchronization is disabled.

The transmission clock signal has a predetermined de-skew clock pattern and the serial data has a predetermined de-skew data pattern may be used in the de-skew mode. The de-skew controller may generate and apply a de-skew control signal for determining a de-skew mode period and a de-skew training signal for determining a de-skew data pattern transmission period to the LVDS transmission block in the de-skew mode.

According to other embodiments of the inventive concept, there is provided an LVDS receiver including a clock signal receiving unit configured to receive a clock signal from an LVDS transmitter through a clock channel; a pattern detector configured to detect a pattern of the received clock signal and to determine an operation mode; and a deserializer block configured to sequentially delay data received through a data channel by a unit delay time, compare the data that has been delayed with a predetermined de-skew data pattern, and determine pass or fail when the operation mode is a de-skew mode.

The operation mode may include the de-skew mode and a normal mode and a pulse width or a duty ratio of the received clock signal may change according to the operation mode. The de-skew mode may be performed during part of a vertical blank period while a vertical synchronous signal for frame synchronization is disabled or may be performed throughout the vertical blank period.

The clock signal receiving unit may generate clock pattern sampling data by sampling the received clock signal at a predetermined sampling interval and transmit the clock pattern sampling data and a frequency-divided clock signal obtained by dividing a frequency of the received clock signal to the pattern detector. The deserializer block may include a deserializer configured to receive serial data through the data channel, delay the serial data in response to a delay control signal, and convert the serial data into parallel data; and a de-skew block configured to compare the parallel data with the de-skew data pattern, determine the pass or the fail, and control the delay control signal.

According to further embodiments of the inventive concept, there is provided a data interface method including generating a transmission clock signal and transmitting data to a data receiver through a clock channel; transmitting serial data synchronized with the transmission clock signal to the data receiver through at least one data channel; receiving the transmission clock signal from a data transmitter through the clock channel and generating a reception clock signal; detecting a pattern of the reception clock signal and determining an operation mode; and sequentially delaying data received through the data channel by a unit delay time, comparing the data that has been delayed with a predetermined de-skew data pattern, and determining pass or fail when the operation mode is a de-skew mode. A pattern of the transmission clock signal changes according to the operation mode.

The operation mode may include the de-skew mode and a normal mode and a pulse width or a duty ratio of the transmission clock signal may change according to the operation mode. The de-skew mode may be performed during part of a vertical blank period while a vertical synchronous signal for frame synchronization is disabled. The transmission clock signal has a predetermined de-skew clock pattern and the serial data has a predetermined de-skew data pattern may be used in the de-skew mode. The determining the operation mode may include generating clock pattern sampling data by sampling the reception clock signal at a predetermined sampling interval and determining the operation mode using the clock pattern sampling data. The determining the pass or the fail may include receiving serial data through the data channel, delaying the serial data in response a delay control signal, converting the serial data into parallel data, comparing the parallel data with the de-skew data pattern, and determining the pass or the fail.

BRIEF DESCRIPTION OF THE DRAWINGS

The above and other features and advantages of the inventive concept will become more apparent by describing in detail exemplary embodiments thereof with reference to the attached drawings in which:

FIG. 4 is a table showing signals illustrated in FIGS. 2A and 2B;

FIG. 7 is a table showing signals illustrated in FIGS. 6A and 6B;

DETAILED DESCRIPTION OF THE EMBODIMENTS

Figure 1:
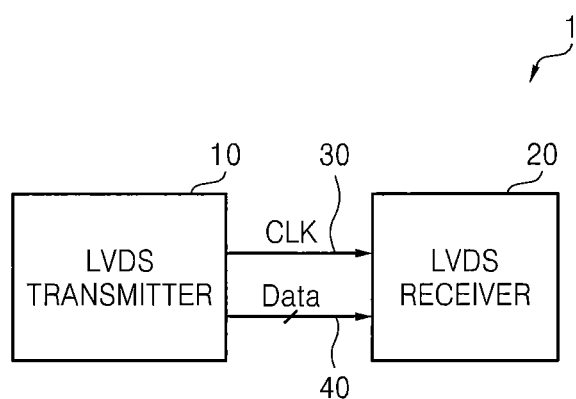
FIG. 1 is a schematic block diagram of a low voltage differential signaling (LVDS) interface system according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a schematic block diagram of a low voltage differential signaling (LVDS) interface system 1 according to some embodiments of the inventive concept. Referring to FIG. 1, the LVDS interface system 1 includes an LVDS transmitter 10, an LVDS receiver 20, a clock channel 30, and at least one data channel 40.

Figure 2A:
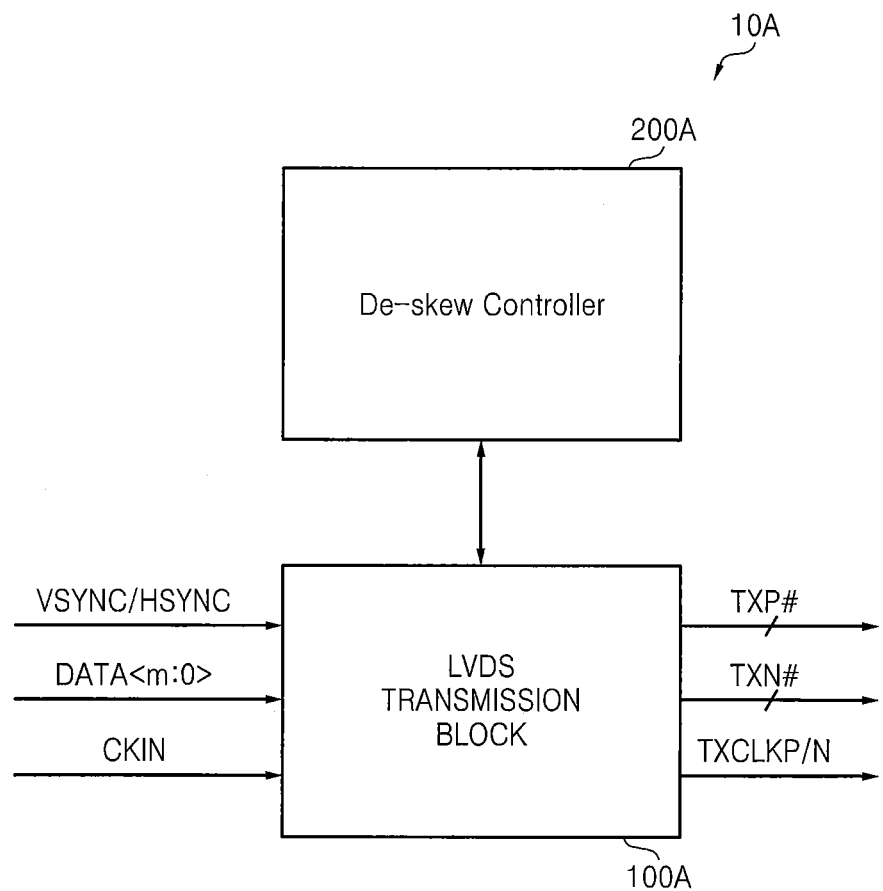
FIG. 2A is a block diagram of an example of an LVDS transmitter illustrated in FIG. 1.
Figure 5A:
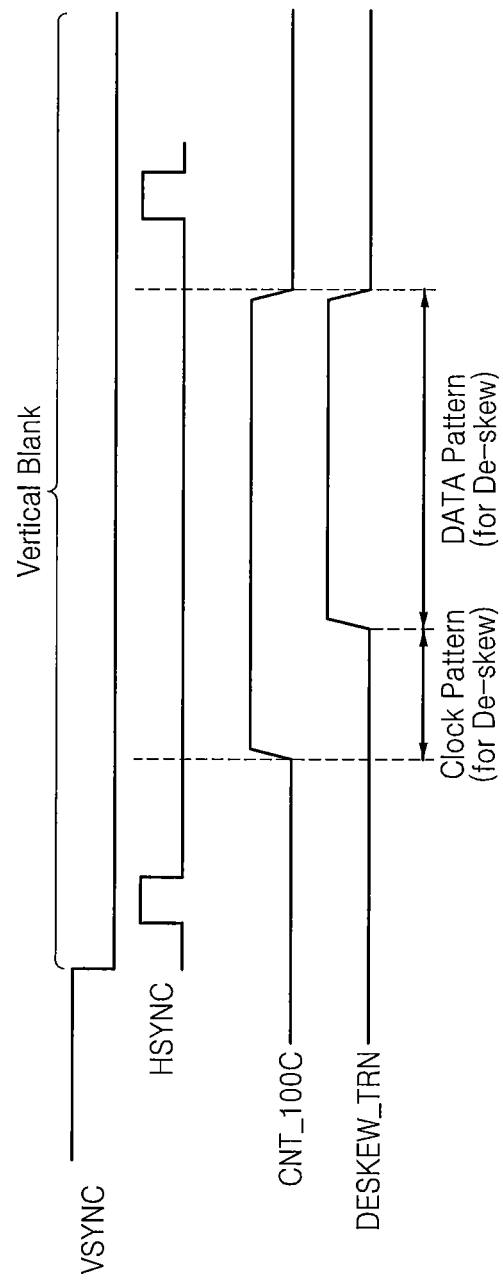
FIG. 5A is a schematic timing chart of signals in the operation of the LVDS transmitter illustrated in FIG. 1 according to some embodiments of the inventive concept.

FIG. 2A is a block diagram of an example 10A of the LVDS transmitter 10 illustrated in FIG. 1. FIG. 5A is a schematic timing chart of signals in the operation of the LVDS transmitter 10 illustrated in FIG. 1 according to some embodiments of the inventive concept. Referring to FIGS. 2A and 5A, the LVDS transmitter 10A includes an LVDS transmission block 100A and a de-skew controller 200A.

The LVDS transmission block 100A receives video control signals VSYNC and HSYNC, input data DATA<m:0>, and an input clock signal CKIN, where "m" is an integer of at least 1. The video control signals VSYNC and HSYNC control display of a video signal comprised of a plurality of frames and may have timings illustrated in FIG. 5A. Data is not displayed during a vertical blank period between frames and a de-skew mode may be activated during part of the vertical blank period or throughout the period.

As shown in FIG. 5A, the vertical synchronous signal VSYNC is at a high level while data is being displayed and it may be at a low level during the vertical blank period. Accordingly, when the vertical synchronous signal VSYNC transits to the low level, it is recognized that the LVDS transmission block 100A has entered the vertical blank period. The vertical synchronous signal VSYNC is a video control signal for frame synchronization and the horizontal synchronous signal HSYNC is a video control signal for horizontal synchronization.

Figure 2B:
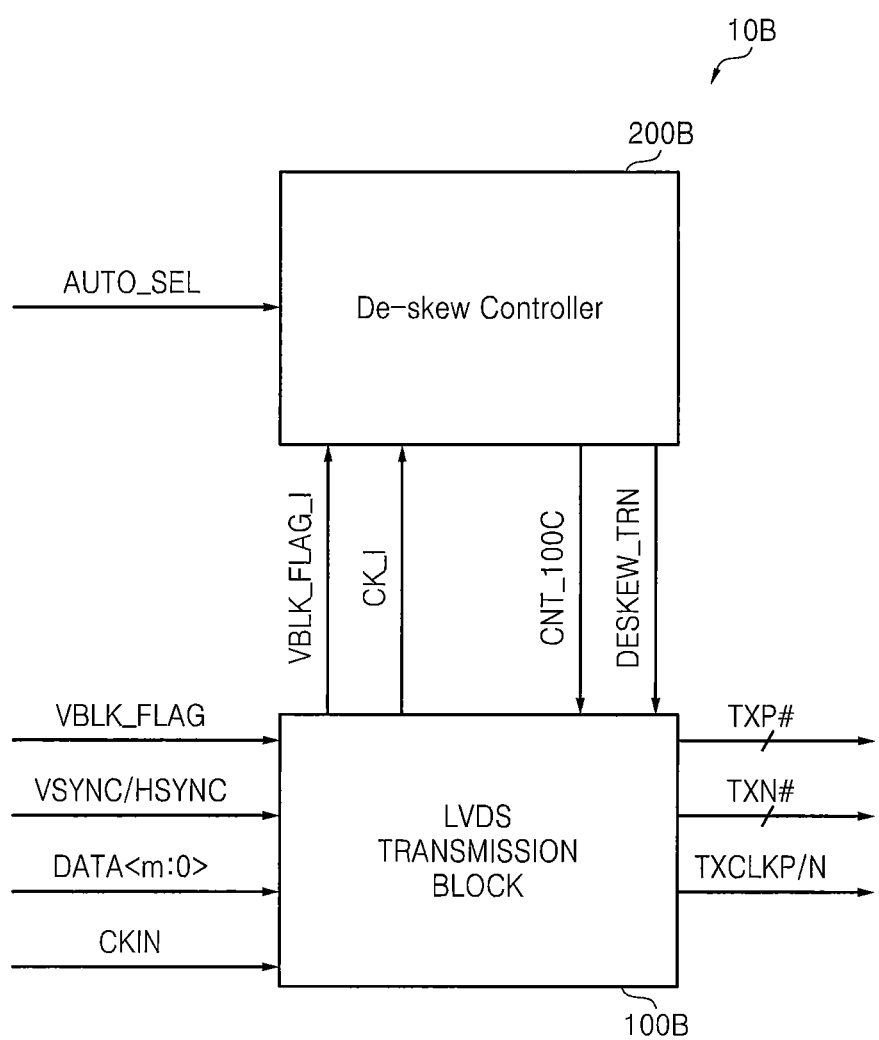
FIG. 2B is a block diagram of another example of the LVDS transmitter illustrated in FIG. 1.

Although not shown in FIG. 2A, the LVDS transmission block 100A may enter a de-skew mode during the vertical blank period in response to a de-skew selection signal (AUTO_SEL in FIG. 2B). This will be described with reference to FIG. 2B later.

The input data DATA<m:0> is (m+1)-bit parallel data and may be an RGB video signal. For instance, when "m" is 29, the input data DATA<m:0> may include a 10-bit R video signal, a 10-bit G video signal, and a 10-bit B video signal. The input clock signal CKIN is also referred to as a pixel clock signal and may be generated by an oscillator (not shown) or a system phase-locked loop (PLL) (not shown). The input data DATA<m:0> may be input in synchronization with the input clock signal CKIN.

The LVDS transmission block 100A may output a signal indicating that the vertical blank period has started to the de-skew controller 200A based on the vertical synchronous signal VSYNC. The de-skew controller 200A may output de-skew control signals (e.g., CNT_100C and DESKEW_TRN in FIG. 5A) for the de-skew mode to the LVDS transmission block 100A when the de-skew mode is enabled and the vertical blank period is entered.

According to some embodiments, the de-skew controller 200A may enter the de-skew mode based on the vertical synchronous signal VSYNC and may output a first de-skew control signal (e.g., CNT_100C in FIG. 5A) and a second de-skew control signal (e.g., DESKEW_TRN in FIG. 5A) to the LVDS transmission block 100A.

The LVDS transmission block 100A may generate a predetermined de-skew clock pattern in response to the first de-skew control signal CNT_100C and may transmit the clock pattern to the LVDS receiver 20 through the clock channel 30. The LVDS transmission block 100A may also generate predetermined de-skew data pattern in response to the second de-skew control signal(e.g., DESKEW_TRN in FIG. 5A) and may transmit the data pattern to the LVDS receiver 20 through the at least one data channel 40.

Accordingly, the LVDS transmission block 100A may transmit a de-skew clock signal instead of a normal clock signal and de-skew data instead of normal data in de-skew mode. The de-skew clock signal has a predetermined de-skew clock pattern and the de-skew data has a predetermined de-skew data pattern.

Figure 3:
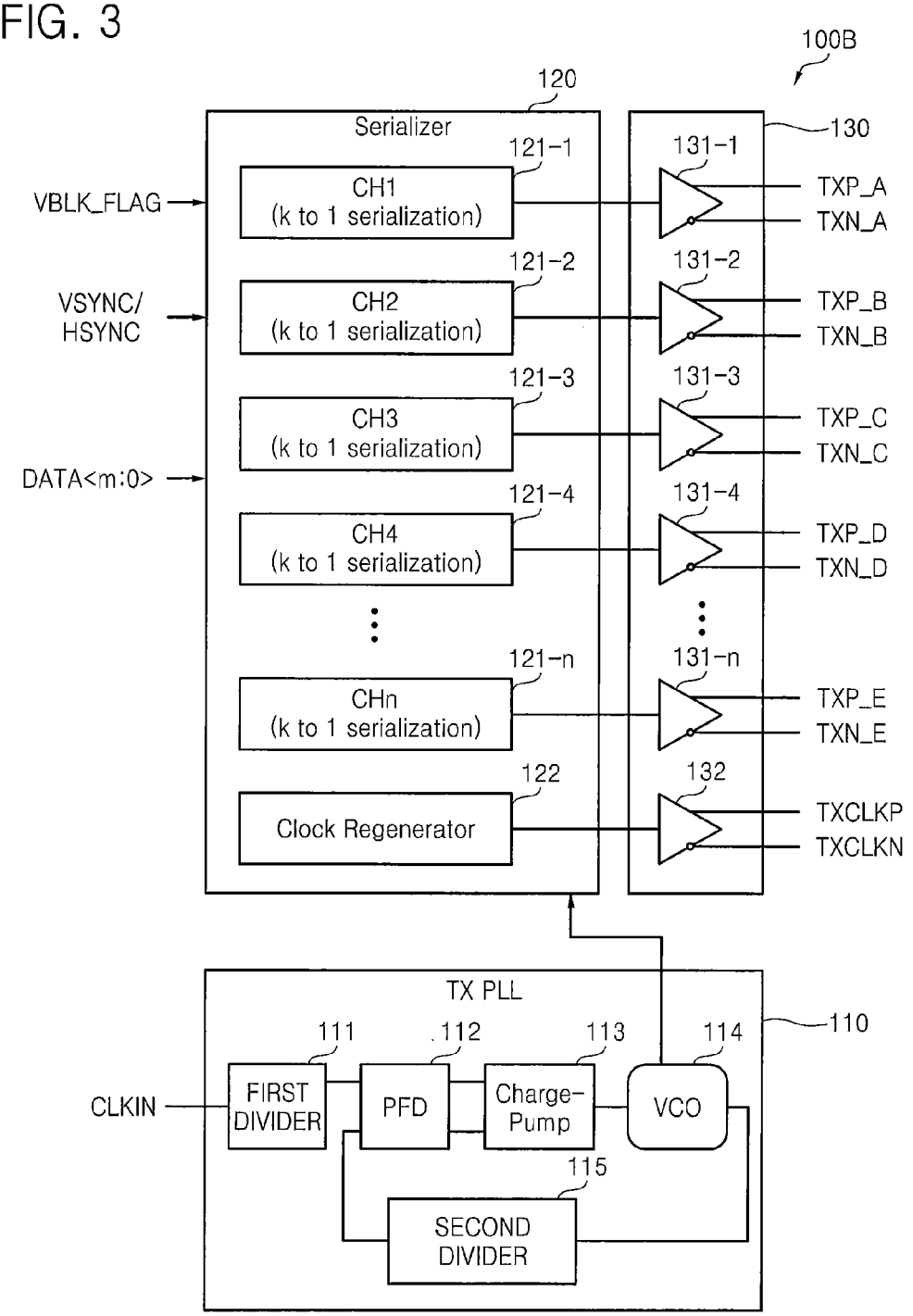
FIG. 3 is a block diagram of an LVDS transmission block illustrated in FIG. 2B.
Figure 5B:
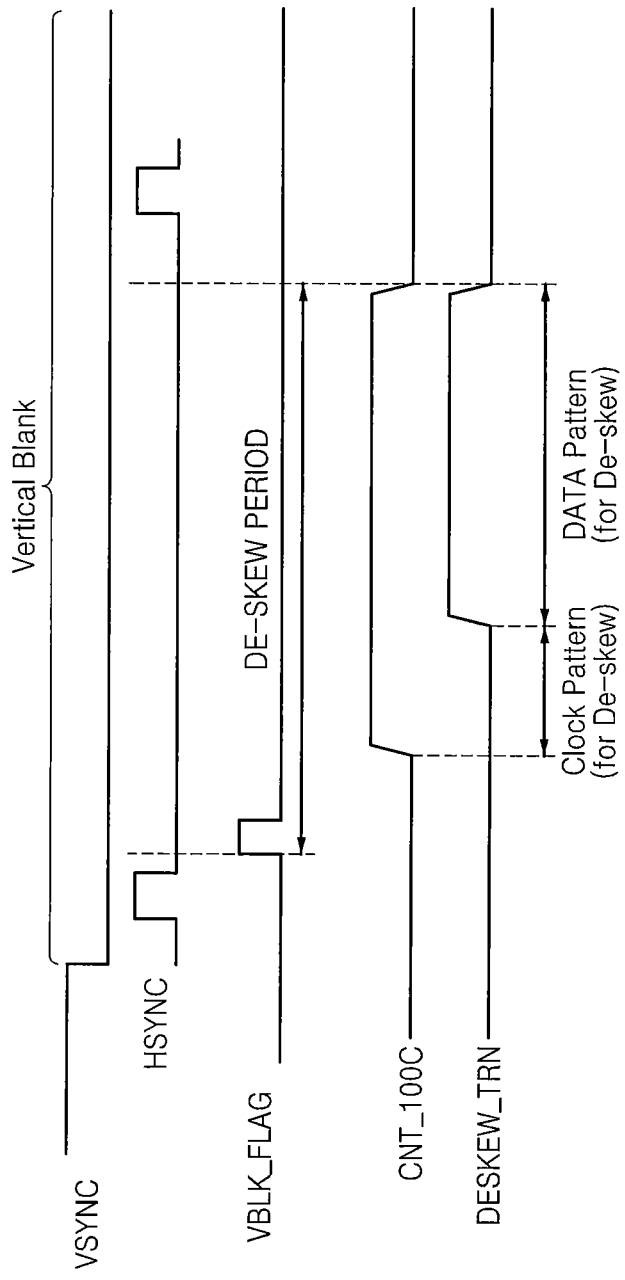
FIG. 5B is a schematic timing chart of signals in the operation of the LVDS transmitter illustrated in FIG. 1 according to other embodiments of the inventive concept.

FIG. 2B is a block diagram of another example 10B of the LVDS transmitter 10 illustrated in FIG. 1. FIG. 3 is a block diagram of an LVDS transmitting block 100B illustrated in FIG. 2B. FIG. 4 is a table showing signals illustrated in FIGS. 2A through 3. FIG. 5B is a schematic timing chart of signals in the operation of the LVDS transmitter 10B.

Referring to FIGS. 2B through 5B, the LVDS transmitter 10B includes an LVDS transmission block 100B and a de-skew controller 200B. The LVDS transmission block 100B may include a transmission PLL 110, a serializer 120, and a transmission driver 130.

The LVDS transmission block 100B receives a vertical blank flag signal VBLK_FLAG, video control signals VSYNC and HSYNC, input data DATA<m:0>, and an input clock signal CKIN, where "m" is an integer of at least 1. The vertical blank flag signal VBLK_FLAG is a flag signal for indicating a vertical blank period, The video control signals VSYNC and HSYNC control display of a video signal comprised of a plurality of frames and it may have timings illustrated in FIG. 5B. Data is not displayed during the vertical blank period between frames and a de-skew mode may be activated during part of the vertical blank period or throughout the period.

The vertical blank flag signal VBLK_FLAG is related with the vertical synchronous signal VSYNC and it may be enabled after the vertical synchronous signal VSYNC transits to a low level. When the vertical blank flag signal VBLK_FLAG is enabled, the LVDS transmission block 100B recognizes that the vertical blank period has started. In addition, the LVDS transmission block 100B may also enter the de-skew mode in response to the de-skew selection signal AUTO_SEL during the vertical blank period.

The input data DATA<m:0> is (m+1)-bit parallel data and may be an RGB video signal. For instance, when "m" is 29, the input data DATA<m:0> may include a 10-bit R video signal, a 10-bit G video signal, and a 10-bit B video signal. The input clock signal CKIN is also referred to as a pixel clock signal and may be generated by an oscillator (not shown) or a system phase-locked loop (PLL) (not shown).

The input data DATA<m:0> may be input in synchronization with the input clock signal CKIN.

The LVDS transmission block 100B may generate an internal vertical blank flag signal VBLK_FLAG_I based on the vertical blank flag signal VBLK_FLAG and an internal pixel clock signal CK_I based on the input clock signal CKIN and may output the internal signals VBLK_FLAG_I and CK_I to the de-skew controller 200B.

The de-skew controller 200B receives the de-skew selection signal AUTO_SEL. The de-skew selection signal AUTO_SEL is used to enable the de-skew mode. For instance, the de-skew mode may be disabled when the de-skew selection signal AUTO_SEL is set to a first logic level (e.g., "LOW" or "0") and may be enabled when the de-skew selection signal AUTO_SEL is set to a second logic level (e.g., "HIGH" or "1"), but the inventive concept is not restricted to this example. The de-skew selection signal AUTO_SEL may be applied by a logic circuit (not shown) and/or it may be set in a particular register.

When the de-skew mode is enabled, the de-skew controller 200B outputs the de-skew control signal CNT_100C and the de-skew training signal DESKEW_TRN for the de-skew mode to the LVDS transmission block 100B based on the internal vertical blank flag signal VBLK_FLAG_I and the internal pixel clock signal CK_I.

Unless the de-skew mode is enabled by the de-skew selection signal AUTO_SEL, the de-skew controller 200B does not output the de-skew control signal CNT_100C and the de-skew training signal DESKEW_TRN to the LVDS transmission block 100B even when the de-skew controller 200B receives the internal vertical blank flag signal VBLK_FLAG_I based on the vertical blank flag signal VBLK_FLAG and the internal pixel clock signal CK_I based on the input clock signal CKIN from the LVDS transmission block 100B. The de-skew control signal CNT_100C is a signal for determining a de-skew mode period. For example, the de-skew control signal CNT_100C may be enabled during a predetermined cycle period (e.g., a 100-cycle period) of the internal pixel clock signal CK_I. However, the inventive concept is not restricted to this example. The de-skew training signal DESKEW_TRN may determine a transmission period of a de-skew data pattern.

For instance, the LVDS transmission block 100B may generate and transmit a de-skew clock pattern to the LVDS receiver 20 through the clock channel 30 when the de-skew control signal CNT_100C is enabled and it may generate and transmit a de-skew data pattern to the LVDS receiver 20 through the at least one data channel 40 when the de-skew training signal DESKEW_TRN is enabled. When both the de-skew control signal CNT_100C and the de-skew training signal DESKEW_TRN are disabled, the LVDS transmission block 100B may stop the transmission of the de-skew data pattern.

According to some embodiments, the LVDS transmitter 10B may not include the de-skew controller 200B. The LVDS transmission block 100B may generate and transmit the de-skew clock pattern to the LVDS receiver 20 through the clock channel 30 and generate and transmit the de-skew data pattern to the LVDS receiver 20 through the data channel 40 when the vertical blank flag signal VBLK_FLAG is enabled. The LVDS transmission block 100B may stop the transmission of the de-skew data pattern when the vertical blank flag signal VBLK_FLAG is disabled.

The de-skew clock pattern may be a clock signal generated in a predetermined pattern to allow the LVDS receiver 20 to enter the de-skew mode. The de-skew data pattern is data with a predetermined pattern used in the de-skew mode.

The predetermined de-skew data pattern is used to allow the LVDS receiver 20 to enter the de-skew mode in the current embodiments, but the inventive concept is not restricted thereto. For instance, a special data pattern for the entry to the de-skew mode may be transmitted to at least one channel among data channels or the LVDS receiver 20 may be allowed to enter the de-skew mode by transmitting a control signal to the LVDS receiver 20 through a special channel other than the clock channel 30 and the data channel 40. The de-skew clock pattern is different from a clock pattern (i.e., a normal clock pattern) that is transmitted in normal mode.

Referring to FIG. 3, the transmission PLL 110 may include a first divider 111, a second divider 115, a phase-frequency detector (PFD) 112, a charge-pump 113, and a voltage-controller oscillator (VCO) 114. The first and second dividers 111 and 115 are frequency dividers that divide the frequency of an input signal by an integer or a real number. The first divider 111 divides the frequency of an input clock signal CLKIN. The second divider 115 divides the frequency of an output clock signal of the VCO 114 and feeds back an output signal to the PFD 112.

The PFD 112 detects a phase difference and frequency difference between an output signal of first divider 111 and the output signal of the second divider 115 and outputs detection signals. The charge-pump 113 controls an output voltage in response to the detection signals. The VCO 114 controls the frequency of the output clock signal in response to the output voltage of the charge-pump 113. The transmission PLL 110 illustrated in FIG. 3 is just an example and the inventive concept is not restricted thereto.

The serializer 120 may include first through n-th transmission channel units 121-1 through 121-*n* (where "n" is an integer of at least 1) and a clock regenerator 122. The transmission driver 130 includes first through n-th data drivers 131-1 through 131-*n* and a clock driver 132. Here, "n" denotes the number of data channels and it is assumed that "n" is 5, but the inventive concept is not restricted to this example. A transmission channel unit and a data driver may be provided for each of data channels.

Each of the first through n-th transmission channel units 121-1 through 121-*n* converts corresponding input data among the input data DATA<m:0> from parallel data into serial data. For instance, each of the first through n-th transmission channel units 121-1 through 121-*n* may convert k-bit parallel data (where "k" is an integer of at least 2) into serial data. When "k" is 6, the first transmission channel unit 121-1 may convert first 6-bit parallel data DATA<5:0> among the input data DATA<m:0> into first serial data and may output the first serial data to the first data driver 131-1 and the second transmission channel unit 121-2 may convert second 6-bit parallel data DATA<11:6> among the input data DATA<m:0> into second serial data and may output the second serial data to the second data driver 131-2. When "k" is 7, each of the first through n-th transmission channel units 121-1 through 121-*n* may convert 7-bit parallel data into serial data.

The clock regenerator 122 generates a transmission clock signal from a clock signal output from the transmission PLL 110 and outputs the transmission clock signal to the clock driver 132.

The first through n-th data drivers 131-1 through 131-*n* and the clock driver 132 may receive an respectively corresponding input signal and generate a differential signal. The first data driver 131-1 may receive the first serial data from the first transmission channel unit 121-1 and generate and transmit first differential data TXP_A and TXN_A through a first data channel. The second data driver 131-2 may receive the second serial data from the second transmission channel unit 121-2 and generate and transmit second differential data TXP_B and TXN_B through a second data channel. The function and structure of the other data drivers 131-3 through 131-*n* are the same as those of the first and second data drivers 131-1 and 131-2.

The clock driver 132 receives the transmission clock signal from the clock regenerator 122 and generates and transmits differential clock signals TXCLKP and TXCLKN through the clock channel 30.

Although an LVDS interface system including at least five data channels and one clock channel is illustrated in FIG. 3, the inventive concept is not restricted to the current embodiments illustrated in FIG. 3. The number of data channels may be at least 1.

Figure 6A:
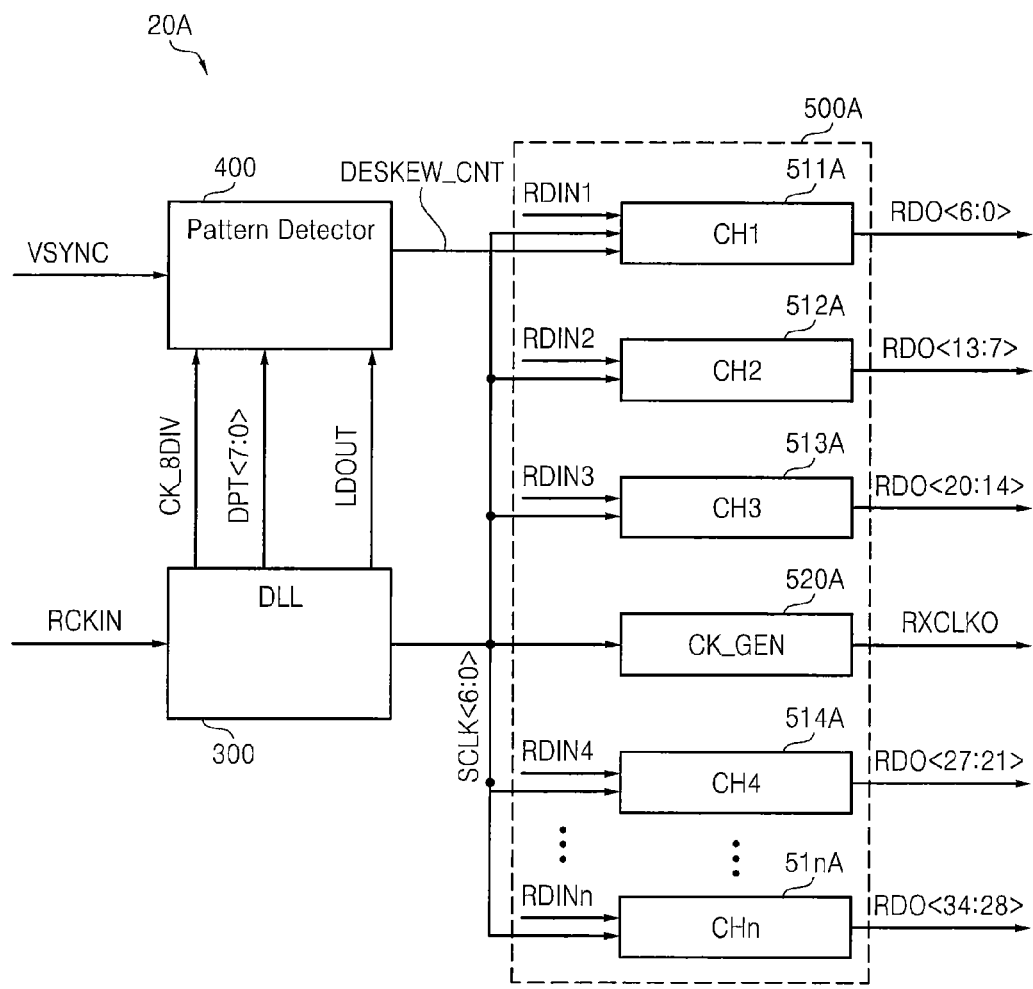
FIGS. 6A and 6B are block diagrams of examples of an LVDS receiver illustrated in FIG. 1.
Figure 6B:
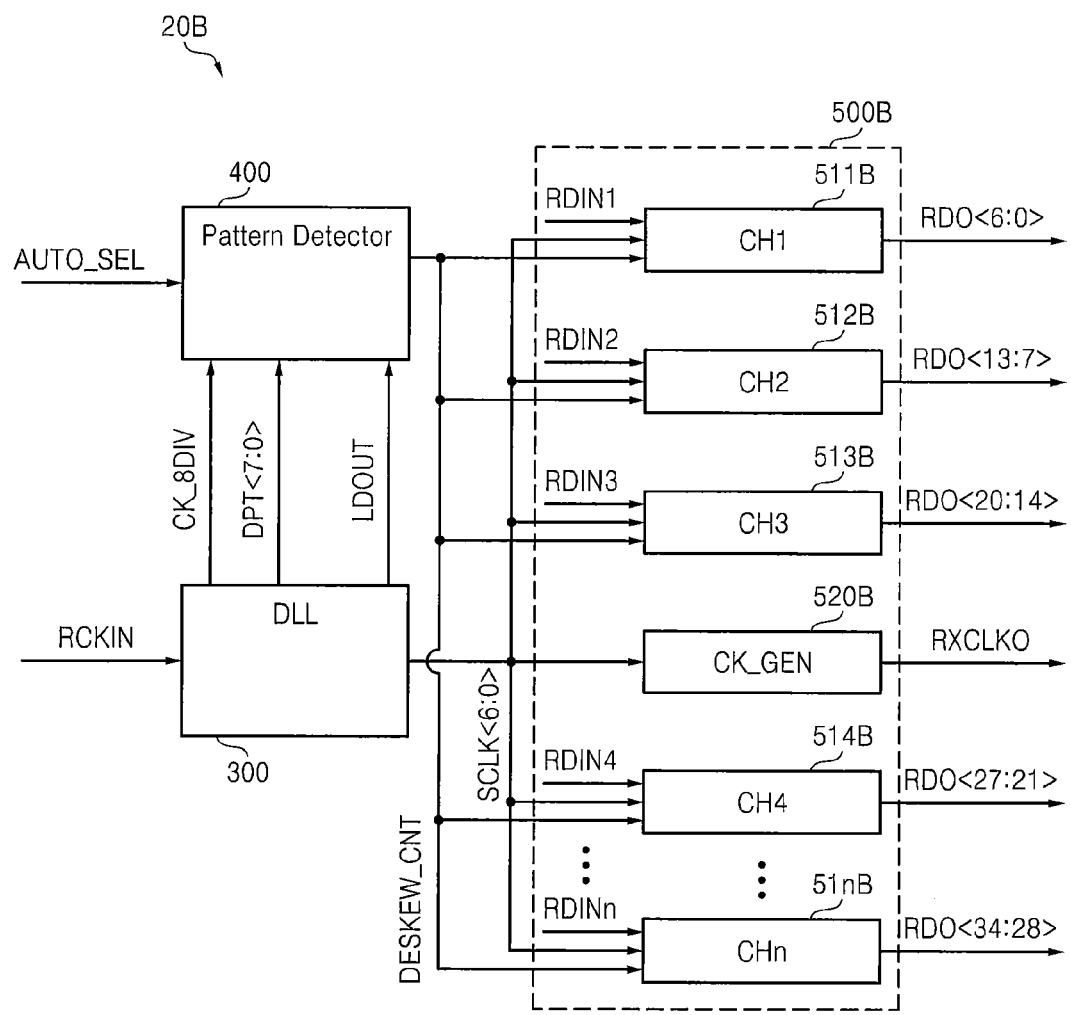

FIGS. 6A and 6B are block diagrams of examples 20A and 20B of the LVDS receiver 20 illustrated in FIG. 1. FIG. 7 is a table showing signals illustrated in FIGS. 6A and 6B. Referring to FIGS. 6A and 7, the LVDS receiver 20A may include a reception delay-locked loop (DLL) 300, a pattern detector 40Q, and a deserializer block 500A. The LVDS receiver 20A may also include a data-receiving buffer (not shown) that receives differential serial data TXP and TXN through the data channel 40 and buffers them and a clock receiving buffer (not shown) that receives the differential clock signals TXCLKP and TXCLKN through the clock channel 30 and buffers them.

The reception DLL 300 receives a reception clock signal RCKIN from the clock receiving buffer, divides the frequency of the reception clock signal RCKIN by an integer or a real number to generate a frequency-divided clock signal CK_8DIV, and applies the frequency-divided clock signal CK_8DIV to the pattern detector 400. The frequency-divided clock signal CK_8DIV may be a result of dividing the frequency of the reception clock signal RCKIN by an integer (e.g., 8), but the inventive concept is not restricted to the current embodiments.

The reception DLL 300 may output a DLL lock indicator signal LDOUT and clock pattern sampling data DPT<7:0> to the pattern detector 400. The DLL lock indicator signal LDOUT indicates lock or unlock of the reception DLL 300. The clock pattern sampling data DPT<7:0> may be 8-bit data obtained by sampling the reception clock signal RCKIN at a predetermined sampling interval (e.g., a predetermined clock cycle). The clock pattern sampling data DPT<7:0> may be input to the pattern detector 400 in synchronization with the frequency-divided clock signal CK_8DIV.

The pattern detector 400 detects an operation mode using the clock pattern sampling data DPT<7:0>. For instance, the pattern detector 400 may compare the clock pattern sampling data DPT<7:0> resulting from sampling of the reception clock signal RCKIN with a predetermined de-skew clock pattern and determine de-skew mode or normal mode.

In de-skew mode, the deserializer block 500A sequentially delays data (i.e., de-skew data) received through a data channel by a unit delay time, compares delayed data with a predetermined de-skew data pattern, and determines pass or fail, thereby determining data latency time. In normal mode, the deserializer block 500A delays data (i.e., normal data) received through a data channel by the latency time determined in de-skew mode and then converts the data into parallel data.

Figure 8:
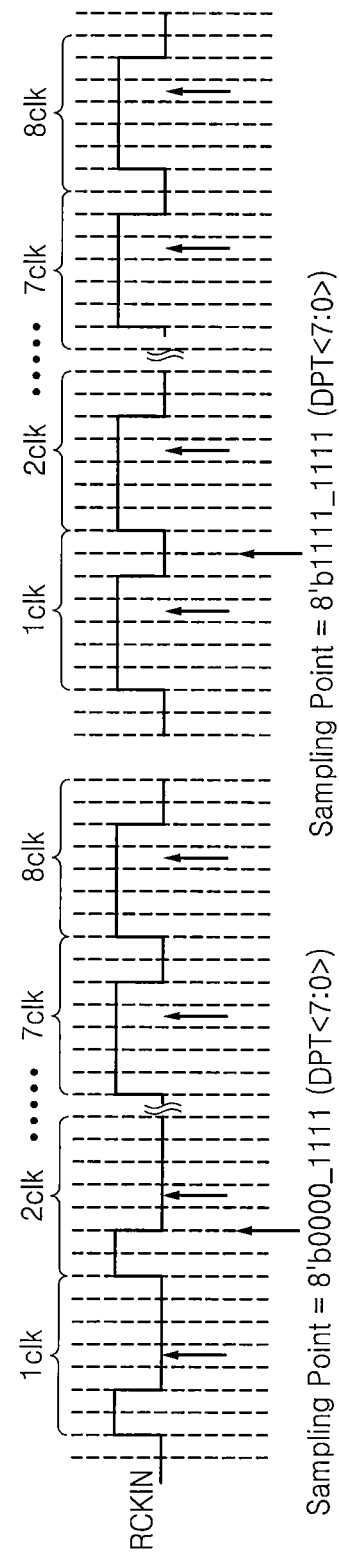
FIG. 8 is a diagram of clock pattern sampling data according to some embodiments of the inventive concept.

FIG. 8 is a diagram of the clock pattern sampling data DPT<7:0> according to some embodiments of the inventive concept. Referring to FIG. 8, the pattern of the reception clock signal RCKIN has a lower duty ratio, i.e., a period of a high level (i.e., "1") is shorter than a period of a low level (i.e., "0"), in the beginning part. Differently, the pattern of the reception clock signal RCKIN has a higher duty ratio, i.e., the high-level period is longer than the low-level period, later.

When "k" is 7, that is, when each of the first through n-th transmission channel units 121-1 through 121-*n* converts 7-bit parallel data into serial data, 7-bit serial data is mapped to a single clock cycle of the reception clock signal RCKIN. In this case, the duty ratio of the reception clock signal RCKIN, i.e., a high-level-to-low-level ratio can be adjusted to 5:2, 4:3, 3:4, or 2:5. In the embodiments illustrated in FIG. 8, the de-skew clock pattern may have an 8-clock cycle period and have a duty ratio of 2:5 during the first four clock cycles and a duty ration of 5:2 during the following four clock cycles. However, in normal mode, a clock pattern having a duty ration of 5:2 may be used. As described above, when different clock patterns are used in de-skew mode and normal mode, the LVDS receiver 20A can detect the clock pattern and determine de-skew mode or normal mode.

The 8-bit clock pattern sampling data DPT<7:0> may be "0000 1111" in de-skew mode and "1111 1111" in normal mode. The pattern detector 400 detects an operation mode using the clock pattern sampling data DPT<7:0>. For instance, the pattern detector 400 may determine the operation mode as de-skew mode when the clock pattern sampling data DPT<7:0> is "0000 1111" and may determine the operation mode as normal mode when the clock pattern sampling data DPT<7:0> is "1111 1111".

The pattern detector 400 generates and transmits a de-skew control signal DESKEW_CNT to the deserializer block 500A. The de-skew control signal DESKEW_CNT is a signal for selecting de-skew mode or normal mode. When the pattern detector 400 determines the operation mode as de-skew mode, the de-skew control signal DESKEW_CNT is enabled.

The deserializer block 500A may include first through n-th reception channel units 511A through 51*n*A and a clock generator 520. Each of the first through n-th reception channel units 511A through 51*n*A receives and converts input serial data into parallel data.

Figure 9:
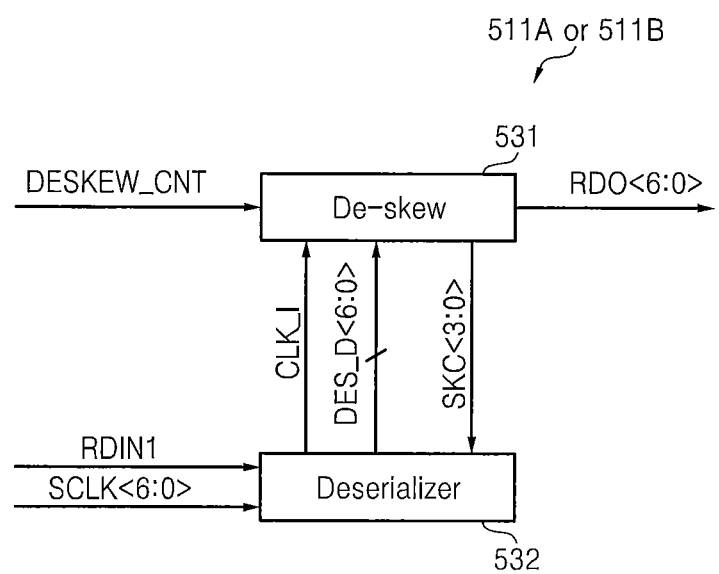
FIG. 9 is a block diagram of a first reception channel unit illustrated in FIGS. 6A and 6B according to some embodiments of the inventive concept.

FIG. 9 is a block diagram of the first reception channel unit 511A illustrated in FIG. 6A according to some embodiments of the inventive concept. Referring to FIG. 9, the first reception channel unit 511A includes a de-skew block 531 and a deserializer 532.

The deserializer 532 receives first input serial data RDIN1 in response to a sampling clock signal SCLK<6:0> and converts the first input serial data RDIN1 into first parallel data DES_D<6:0>. The first input serial data RDIN1 is serial data-that has been output from the first transmission channel unit 121-1 through a first data channel.

Figure 10:
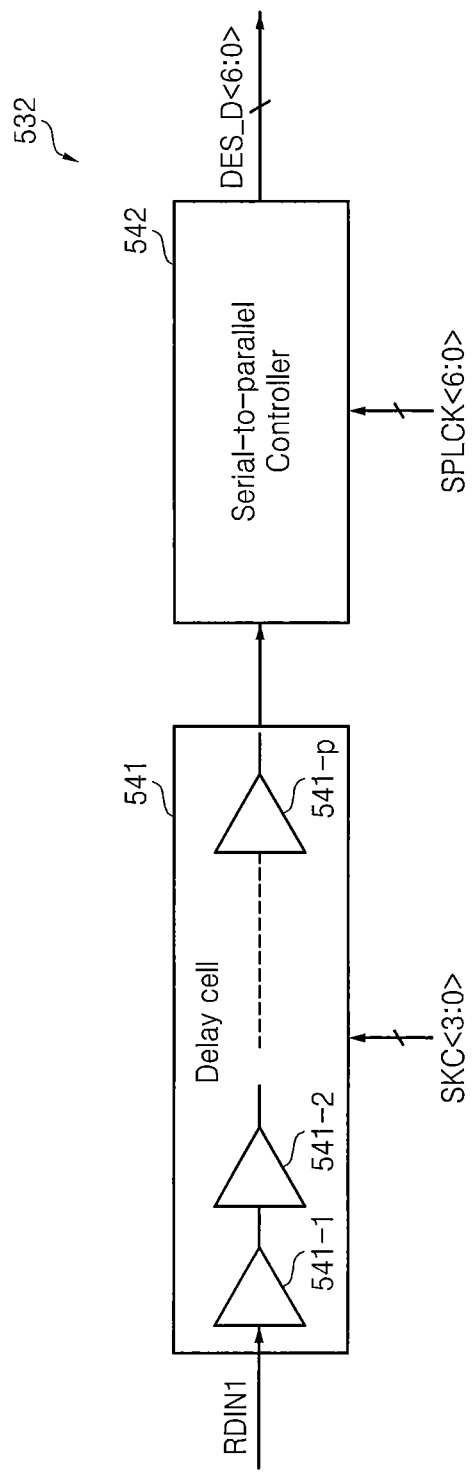
FIG. 10 is a block diagram of a deserializer illustrated in FIG. 9 according to some embodiments of the inventive concept.

FIG. 10 is a block diagram of the deserializer 532 illustrated in FIG. 9 according to some embodiments of the inventive concept. Referring to FIG. 10, the deserializer 532 may include a delay cell circuit 541 and a serial-to-parallel converter 542. The delay cell circuit 541 may include a plurality of (at least two) unit delay cells 541-1 through 541-*p* (where "p" is an integer of at least 2) which are connected in series. The unit delay cells 541-1 through 541-*p* may have the same or different delay time.

The delay cell circuit 541 delays and outputs the first input serial data RDIN1 in response to a delay control signal SKC<3:0>. The latency of the first input serial data RDIN1 is different depending on the value of the delay control signal SKC<3:0>. For instance, the number of the unit delay cells 541-1 through 541-*p* which the first input serial data RDIN1 passes through may be different depending on the delay control signal SKC<3:0>. In some embodiments, "p" may be 12 and the delay control signal SKC<3:0> may be a 4-bit digital signal, but the inventive concept is not restricted to these embodiments.

The serial-to-parallel converter 542 converts the first input serial data RDIN1 that has been delayed by the delay cell circuit 541 into first parallel data DES_D<6:0>.

The de-skew block 531 operates in response to the de-skew control signal DESKEW_CNT. In de-skew mode, the de-skew block 531 receives the first parallel data DES_D<6:0>, compares the first parallel data DES_D<6:0> with a first de-skew data pattern that has been stored, and determines pass or fail.

The first de-skew data pattern is data corresponding to the first data channel among the above-described de-skew data pattern. In other words, in de-skew mode the predetermined de-skew data pattern is transmitted between the LVDS transmitter 10 and the LVDS receiver 20 and the transmitted data is compared with the de-skew data pattern that has been stored in order to determine pass or fail.

The de-skew block 531 also adjusts the value of the delay control signal SKC<3:0>. For instance, the de-skew block 531 may sequentially increase the value of the delay control signal SKC<3:0> by 1 from an initial value. Then, the latency of the first input serial data RDIN1 may be changed depending on the value of the delay control signal SKC<3:0>, changing the result of determining pass or fail.

Figure 11:
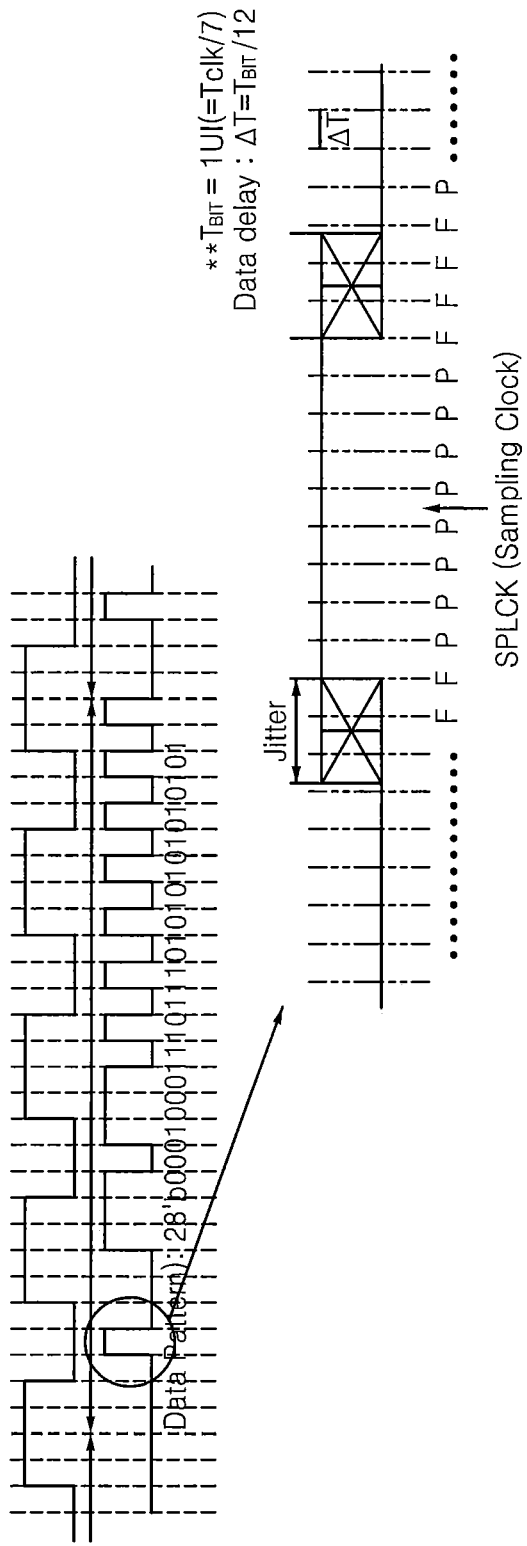
FIG. 11 is a schematic timing chart of signals in the operation of the first reception channel unit illustrated in FIGS. 9 and 10.

FIG. 11 is a schematic timing chart of signals in the operation of the first reception channel units 511A illustrated in FIGS. 9 and 10. Referring to FIGS. 9 through 11, the delay cell circuit 541 sequentially shifts (i.e., delays) the first input serial data RDIN1 by ΔT according to the delay control signal SKC<3:0>. Here, ΔT denotes a delay time of a unit delay cell (i.e., one of the unit delay cells 541-1 through 541-$p$) and may be $T_{BIT}/12$. Here, $T_{BIT}$ is 1 UI and may be $T_{clk}/7$ and $T_{clk}$ may be a single clock cycle of the reception clock signal RCKIN.

In the current embodiments, it is assumed that "k" is 7 and "p" is 12. Accordingly, 7-bit serial data is matched to each channel during one clock cycle. Therefore, a time corresponding to each bit in serial data, i.e., a 1-bit data period $M_{BIT}$ is $T_{clk}/7$ and ΔT is $T_{BIT}/12$.

The serial-to-parallel converter 542 converts the first input serial data RDIN1 that has been delayed by the delay cell circuit 541 into the first parallel data DES_D<6:0> using the sampling clock signal SCLK<6:0>. The sampling clock signal SCLK<6:0> is a clock signal generated by the reception DLL 300 and may have the same frequency as the reception clock signal RCKIN but have seven different phases. Accordingly, the serial-to-parallel converter 542 may convert every seven bits of the first input serial data RDIN1 into the first parallel data DES_D<6:0>.

Specific values used in the above-described embodiments are just examples used for convenience' sake in the description and the inventive concept is not restricted thereto.

The de-skew block 531 compares the first parallel data DES_D<6:0> with the first de-skew data pattern among the predetermined de-skew data pattern and determines pass when the first parallel data DES_D<6:0> is the same as the first de-skew data pattern and determines fail when the first parallel data DES_D<6:0> is different from the first de-skew data pattern.

As shown in FIG. 11, fail, pass and fail periods may repeatedly appear according to the delay time of the delay cell circuit 541 that changes depending on the delay control signal SKC<3:0>.

The de-skew block 531 may select latency corresponding to a pass at the center of the pass period. In other words, a value of the delay control signal SKC<3:0> that corresponds to the central pass in the pass period may be selected. Accordingly, the selected delay control signal SKC<3:0> or latency corresponds to a value that minimizes the skew between data and a clock signal. Therefore, when de-skew mode is terminated, an operation in normal mode is performed according to the delay control signal SKC<3:0> that has been selected in de-skew-mode.

In normal mode, the deserializer 532 delays the first input serial data RDIN1 in response to the delay control signal SKC<3:0> that has been selected in de-skew mode, converts the first input serial data RDIN1 that has been delayed into the first parallel data DES_D<6:0>, and outputs the first parallel data DES_D<6:0> to the de-skew block 531. The de-skew block 531 receives and buffers the first parallel data DES_D<6:0> and outputs first output data RDO<6:0>. In the embodiments illustrated in FIG. 6A, among the first through n-th reception channel units 511A through 51nA, only the first reception channel unit 511A operates in de-skew mode so that it sequentially delays de-skew data received through the first data channel by a unit delay time, compares the delayed data with a predetermined de-skew data pattern, determines pass or fail, and decides latency.

In normal mode, all of the first through n-th reception channel units 511A through 51nA may delay normal data according to latency (e.g., the delay control signal SKC<3:0>) determined by the first reception channel unit 511A and may convert the delayed data into parallel data.

The structures of the first through n-th reception channel units 511B through 51nB of FIG. 6B are substantially the same as those of the first through n-th reception channel units 511A through 51nA of FIG. 6A. Thus, the first through n-th reception channel units 511B through 51nB will now be described focusing on the differences from the first through n-th reception channel units 511A through 51nA of FIG. 6A. In the embodiments illustrated in FIG. 6B, each of first through n-th reception channel units 511B through 51nB operates in de-skew mode so that it delays de-skew data received through a corresponding data channel by a unit delay time, compares the delayed data with a predetermined de-skew data pattern, determines pass or fail, and decides latency. In normal mode, each of the first through n-th reception channel units 511B through 51nB may delay normal data according to the latency determined in de-skew mode and may convert the delayed data into parallel data.

When "n" data channels are provided as described above, a de-skew function according to some embodiments of the inventive concept may be implemented for every data channel or it may be implemented for only some of the data channels and latency determined for some data channels may be used for the remaining data channels.

Figure 12:
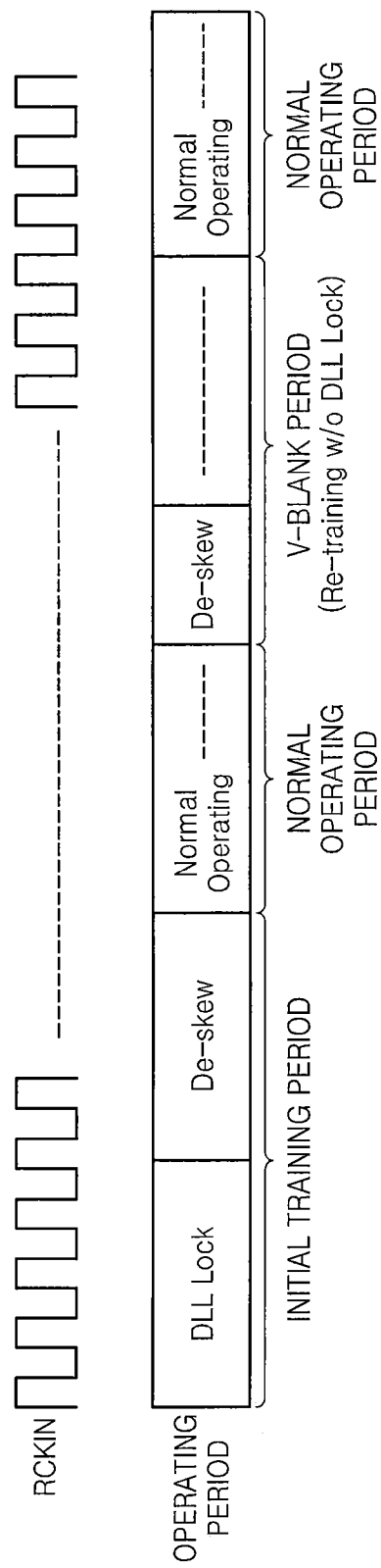
FIG. 12 is a diagram of the operating period of an LVDS receiver according to some embodiments of the inventive concept.

FIG. 12 is a diagram of the operating period of an LVDS receiver according to some embodiments of the inventive concept. The LVDS receiver has an initial training period, a normal operating period, and a V-blank period. The initial training period is an initial operating period following power-on. DLL locking and de-skew mode may be performed in the initial training period. After the initial training period, the normal operating period and the V-blank period may appear alternately. Each normal operating period may correspond to a single frame of video data. In the normal operating period, video data is displayed. The V-blank period is an inter-frame period in which video data is not displayed. De-skew mode may be performed during part of the V-blank period or throughout the V-blank period.

As described above, the embodiments of the inventive concept have a new de-skew protocol for display interface. The embodiments may be used in any field of high-speed data interface. For instance, they may be used in apparatus for interfacing RGB data in display panels such as digital television (DTV) panels and liquid crystal display (LCD) panels.

Figure 13:
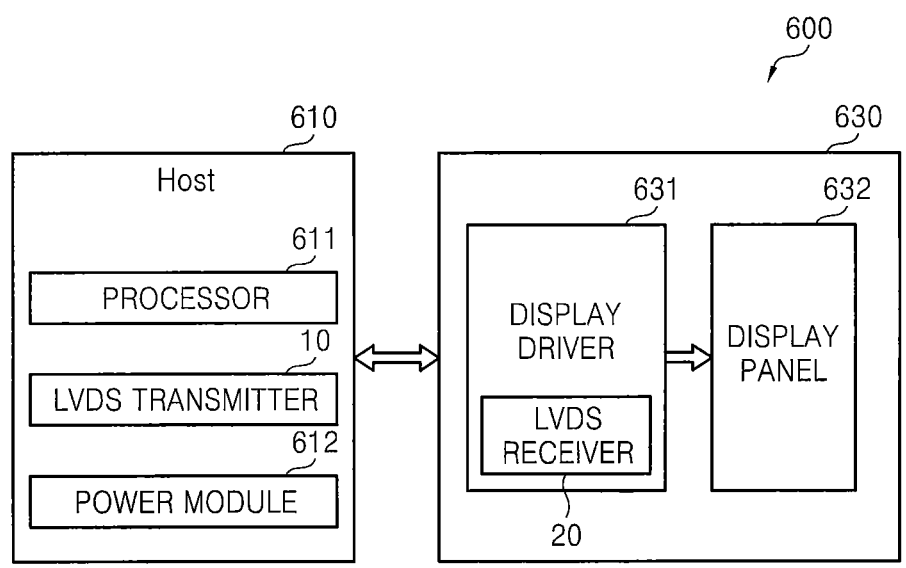
FIG. 13 is a schematic block diagram of an electronic system according to some embodiments of the inventive concept.

FIG. 13 is a schematic block diagram of an electronic system 600 according to some embodiments of the inventive concept. Referring to FIG. 13, the electronic system 600 may include a host 610 and a display device 630. The host 610 includes a processor 611, the LVDS transmitter 10, and a power module 612. The electronic system 600 may be a mobile device, a handheld device or a handheld computer such as a mobile phone, a smart-phone, a tablet personal computer (PC), a personal digital assistant (PDA), a portable multimedia player (PMP), an MP3 player, or an automotive navigation system, which can display images or video signals in the display device 630.

An external memory (not shown) stores program instructions executed in the processor 611. The external memory (not shown) may store image data used to display still images in the display device 630. In addition, the external memory(not shown) may also store image data used to display moving images. The moving images may be a series of different still images presented in a short time.

The processor 611 controls the display device 630. According to embodiments, the processor 611 may be called an integrated circuit (IC), a processor, an application processor, a multimedia processor, or an integrated multimedia processor.

The display device 630 includes a display driver 631 and a display panel 632. In some embodiments, the processor 611 and the display driver 631 may be implemented together in a single module, a single system-on-chip, or a single package, e.g., a multi-chip package. In other embodiments, the display driver 631 and the display panel 632 may be implemented together in a single module.

The display driver 631 controls the operations of the display panel 632 according to signals output from the processor 611. For instance, the display driver 631 may transmit image data received from the processor 611 to the display panel 632 as an output image signal using a selected interface.

The display driver 631 may include the LVDS receiver 20. The display panel 632 may display the output image signal received from the display driver 631. The display panel 632 may be implemented as an LCD panel, a light emitting diode (LED) display panel, an organic LED (OLED) display panel, or an active-matrix OLED (AMOLED) display panel.

Figure 14:
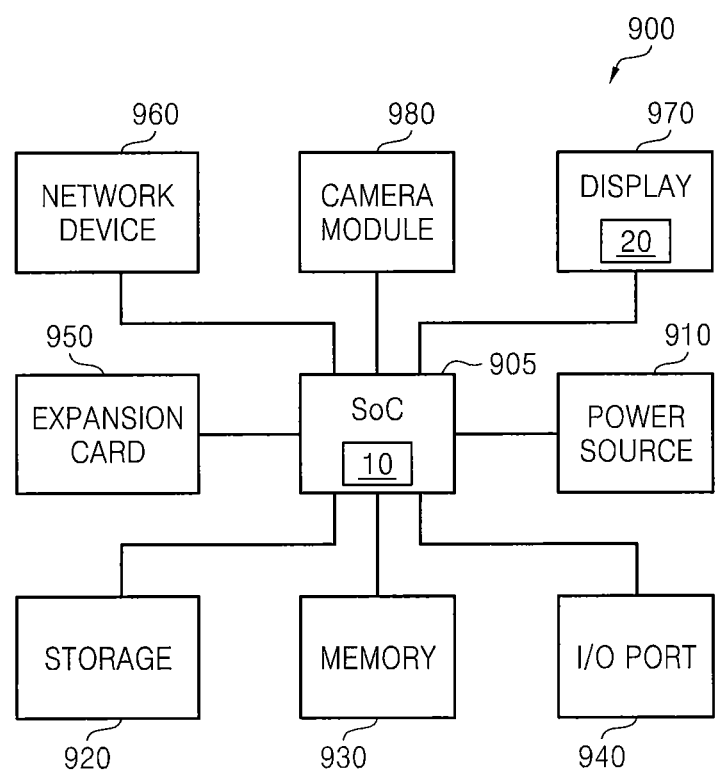
FIG. 14 is a block diagram of an electronic system 900 according to some embodiments of the inventive concept.

FIG. 14 is a block diagram of an electronic system 900 according to some embodiments of the inventive concept. Referring to FIG. 14, the electronic system 900 may be implemented as a personal computer (PC), a data server or a portable electronic device. The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), portable navigation device (PND), a handheld game console, or an e(electronic)-book device. The electronic system 900 includes a SoC 905, a power source 910, a storage 920, a memory 930, I/O ports 940, an expansion card 950, a network device 960, a display 970. The electronic system 900 may also include a camera module 980. The SoC 905 may control the operation of at least one of the elements 910 through 970. The SoC 905 may include the LVDS transmitter 10. The power source 910 may supply an operating voltage to at least one of the elements 905 and 910 through 980. The power source 910 may be controlled by the PMIC 40 illustrated in FIG. 1. The storage 920 may be implemented by a hard disk drive (HDD) or a solid state drive (SSD). The memory 930 may be implemented by a volatile or non-volatile memory. A memory controller (not shown) that controls a data access operation, e.g., a read operation, a write operation (or a program operation), or an erase operation, on the memory 930 may be integrated into or embedded in the SoC 905. Alternatively, the memory controller may be provided between the SoC 905 and the memory 930.

The I/O ports 940 are ports that receive data transmitted to the electronic system 900 or transmit data from the electronic system 900 to an external device. For instance, the I/O ports 940 may include a port connecting with a pointing device such as a computer mouse, a port connecting with a printer, and a port connecting with a USB drive. The expansion card 950 may be implemented as a secure digital (SD) card or a multimedia card (MMC). The expansion card 950 may be a subscriber identity module (SIM) card or a universal SIM (USIM) card. The network device 960 enables the electronic system 900 to be connected with a wired or wireless network. The display 970 displays data output from the storage 920, the memory 930, the I/O ports 940, the expansion card 950, or the network device 960. The display 970 may include the LVDS receiver 20.

The camera module 980 converts optical images into electrical images. Accordingly, the electrical images output from the camera module 980 may be stored in the storage 920, the memory 930, or the expansion card 950. Also, the electrical images output from the camera module 980 may be displayed through the display 970.

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers in the art to which this invention belongs.

As described above, according to some embodiments of the inventive concept, a communication protocol for de-skew is used in LVDS interface, thereby decreasing skew between a clock signal and data. In addition, a conventional LVDS protocol is used as it is without adding or changing a pin or channel in the LVDS interface, so that the embodiments of the inventive concept are compatible with the existing commercialized LVDS.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A low voltage differential signaling (LVDS) transmitter, comprising:
an LVDS transmission device configured to generate a transmission clock and serial data synchronized to the transmission clock on respective clock and data channels, said transmission clock having different signal patterns when said LVDS transmission device is operating in normal and de-skew modes of operation; and
a de-skew controller electrically coupled to said LVDS transmission device, said de-skew controller configured to drive said LVDS transmission device with control signals that switch said LVDS transmission device between the normal and de-skew modes of operation;
wherein a duty cycle of the transmission clock during the de-skew mode of operation is unequal to a duty cycle of the transmission clock during the normal mode of operation.

2. The LVDS transmitter of claim 1, wherein during the de-skew mode of operation, both the transmission clock and the serial data have respective predetermined patterns.

3. The LVDS transmitter of claim 1, wherein during the de-skew mode of operation, said de-skew controller provides said LVDS transmission device with a de-skew control signal that determines a de-skew mode period and a de-skew training signal that determines a de-skew data pattern transmission period.

4. The LVDS transmitter of claim 3, wherein said de-skew controller generates the de-skew control signal in response to a vertical blank flag signal generated by said LVDS transmission device.

5. The LVDS transmitter of claim 1, wherein said LVDS transmission device comprises:
a transmission phase-locked loop (PLL) configured to generate the transmission clock;
a serializer configured to convert parallel data received at an input of said LVDS transmission device into the serial data; and
a transmission driver configured to transmit the transmission clock and the serial data to respective clock and data channels at an output of said LVDS transmission device.

6. A low voltage differential signaling (LVDS) receiver, comprising:
a pattern detector configured to detect a pattern of a clock received at an input thereof and determine an operating mode of the receiver from a plurality of possible operating modes based on the detected pattern; and
a deserializer block configured to delay data received at a serial data port of the receiver and compare the delayed data with a de-skew data pattern to thereby determine a pass/fail condition when the receiver is disposed in a de-skew mode of operation;
wherein said pattern detector detects a pattern of the clock by evaluating a duty cycle of the clock received at the input to thereby determine whether a normal mode of operation or the de-skew mode of operation is to be entered.

7. The LVDS receiver of claim 6, wherein said deserializer block comprises:
a delay device comprising a plurality of delay cells electrically coupled in series, said delay device configured to receive the data received at the serial port and responsive to a delay control signal that determines a latency provided by said delay device; and
a serial-to-parallel converter configured to convert serial data output from said delay device into parallel data.

8. The LVDS receiver of claim 7, wherein said deserializer comprises a de-skew circuit configured to compare the parallel data with the de-skew data pattern to thereby determine the pass/fail condition.

9. A low voltage differential signaling (LVDS) transmitter comprising:
an LVDS transmission block configured to generate and transmit a transmission clock signal to an LVDS receiver through a clock channel and to transmit serial data synchronized with the transmission clock signal through at least one data channel; and
a de-skew controller configured to control an operation of the LVDS transmission block in a de-skew mode,
wherein the LVDS transmission block generates the transmission clock signal in a different pattern according to an operation mode;
wherein the operation mode comprises the de-skew mode and a normal mode and a pulse width or a duty ratio of the transmission clock signal changes according to the operation mode.

10. The LVDS transmitter of claim 9, wherein the de-skew mode is performed during part of a vertical blank period while a vertical synchronous signal for frame synchronization is disabled or is performed throughout the vertical blank period.

11. The LVDS transmitter of claim 10, wherein the transmission clock signal having a predetermined de-skew clock pattern and the serial data having a predetermined de-skew data pattern are used in the de-skew mode.

12. The LVDS transmitter of claim 9, wherein the de-skew controller generates and applies a de-skew control signal for determining a de-skew mode period and a de-skew training signal for determining a de-skew data pattern transmission period to the LVDS transmission block in the de-skew mode.

13. The LVDS transmitter of claim 12, wherein the LVDS transmission block generates a de-skew clock pattern in response to the de-skew control signal and transmits the de-skew clock pattern as the transmission clock signal to the LVDS receiver through the clock channel and the LVDS transmission block generates a predetermined de-skew data pattern in response to the de-skew training signal and transmits the de-skew data pattern as the serial data to the LVDS receiver through the data channel.

14. The LVDS transmitter of claim 13, wherein the de-skew controller enables the de-skew control signal in response to a vertical blank flag signal indicating a vertical blank period and enables the de-skew training signal after a predetermined period of time after enabling the de-skew control signal.

15. The LVDS transmitter of claim 9, wherein the LVDS transmission block comprises:
a transmission phase-locked loop (PLL) configured to generate the transmission clock signal;
a serializer configured to convert parallel data into the serial data according to the transmission clock signal; and
a transmission driver configured to transmit the transmission clock signal to the clock channel and transmit the serial data to the data channel.

* * * * *